(12) United States Patent
Shouno (10) Patent No.: US 9,497,298 B2
(45) Date of Patent: Nov. 15, 2016

(54) INFORMATION PROCESSING APPARATUS, NETWORK INTERFACE DEVICE, CONTROL METHOD THEREFOR, AND STORAGE MEDIUM

(75) Inventor: Hiroki Shouno, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/755,278

(22) Filed: Apr. 6, 2010

(65) Prior Publication Data

US 2010/0262691 A1 Oct. 14, 2010

(30) Foreign Application Priority Data

Apr. 9, 2009 (JP) ................... 2009-094996

(51) Int. Cl.
*G06F 15/173* (2006.01)
*H04L 29/06* (2006.01)
*H04L 29/12* (2006.01)

(52) U.S. Cl.
CPC ......... *H04L 69/28* (2013.01); *H04L 29/12056* (2013.01); *H04L 61/1505* (2013.01)

(58) Field of Classification Search
None
See application file for complete search history.

(56) References Cited

U.S. PATENT DOCUMENTS

| | | | | |
|---|---|---|---|---|
| 6,408,395 B1 * | 6/2002 | Sugahara et al. | ............. | 713/310 |
| 6,718,381 B1 * | 4/2004 | Herzi | ............. | 709/224 |
| 7,215,437 B2 * | 5/2007 | Shima | ............. | G06F 3/1222 |
| | | | | 358/1.15 |
| 7,286,252 B2 * | 10/2007 | Kawabuchi | ............. | G06F 3/1204 |
| | | | | 358/1.1 |
| 7,372,588 B1 * | 5/2008 | Jeong | ............. | G06F 3/1212 |
| | | | | 358/1.14 |
| 7,480,729 B2 * | 1/2009 | Fujihara | ............. | 709/232 |
| 7,831,702 B2 * | 11/2010 | Johnson | ............. | 709/223 |
| 2004/0170460 A1 * | 9/2004 | Mokuya | ............. | G06F 3/121 |
| | | | | 400/76 |
| 2004/0266427 A1 * | 12/2004 | Kurokawa | ............. | 455/426.2 |
| 2006/0236143 A1 | 10/2006 | Kidoguchi | | |
| 2006/0271678 A1 * | 11/2006 | Jessup et al. | ............. | 709/224 |
| 2007/0067445 A1 * | 3/2007 | Vugenfirer et al. | ............. | 709/224 |

FOREIGN PATENT DOCUMENTS

| | | |
|---|---|---|
| CN | 1226017 A | 8/1999 |
| CN | 1680112 A | 10/2005 |

(Continued)

OTHER PUBLICATIONS

Kenneth J. Christensen et al.; "The Next Frontier for Communications Networks: Power Management;" Computer Communications, vol. 27, Issue 18, 2004, pp. 1758-1770.

(Continued)

*Primary Examiner* — Azizul Choudhury
(74) *Attorney, Agent, or Firm* — Canon U.S.A., Inc. IP Division (57) ABSTRACT

An apparatus stores address information of a server and transmits information of an apparatus to the server at a regular interval. The apparatus, when shifting from a normal state to a power-saving state, keeps continued regular transmission, by notifying a network interface device of the stored address information and the information of the apparatus.

6 Claims, 5 Drawing Sheets

(56) References Cited

FOREIGN PATENT DOCUMENTS

| | | |
|---|---:|---:|
| CN | 1933433 A | 3/2007 |
| CN | 101287036 A | 10/2008 |
| JP | H0371296 A | 3/1991 |
| JP | 10-187373 A | 7/1998 |
| JP | 2000-092098 A | 3/2000 |
| JP | 2000-101648 A | 4/2000 |
| JP | 2001-257688 A | 9/2001 |
| JP | 2003-319119 A | 11/2003 |
| JP | 2005-045301 A | 2/2005 |
| JP | 2005-242431 A | 9/2005 |
| JP | 2006-259906 A | 9/2006 |
| JP | 2007-148829 A | 6/2007 |
| JP | 2008-001000 A | 1/2008 |
| JP | 2009-289255 A | 12/2009 |
| KR | 10-2000-0021853 A | 4/2000 |

OTHER PUBLICATIONS

"This makes your understanding complete—DHCP—Mechanism for automatizing IP setting", Nikkei Network, Domestic Technical Journal; Topic 2, vol. 31, p. 106-119, 2002.

\* cited by examiner

INFORMATION PROCESSING APPARATUS, NETWORK INTERFACE DEVICE, CONTROL METHOD THEREFOR, AND STORAGE MEDIUM

BACKGROUND OF THE INVENTION

1. Field of the Invention

The present invention relates to an information processing apparatus connected to a network via a network interface device and capable of communicating with a server on the network.

2. Description of the Related Art

In an information processing apparatus, such as a multifunction peripheral or a printer, various techniques for reducing power consumption have been introduced hitherto. Among them, a technique called a deep sleep is to put the information processing apparatus into a sleep state by stopping supplying power to respective areas except for a random-access memory (RAM) and a network interface card (hereinafter, NIC) of the information processing apparatus and an operation unit of the information processing apparatus. Accordingly, it becomes possible to reduce power consumption to a very low value when the information processing apparatus is in the deep sleep state.

In such a deep sleep technology for enabling the information processing apparatus to operate with a very low electricity, when the information processing apparatus is in the deep sleep state, the passage of electric current through drums and fixing devices in a printer unit and a central processing unit (CPU) and a hard disk drive (HDD) in a controller unit is stopped. At this time, the information processing apparatus cannot execute main functions such as printing and image processing that the information processing apparatus has.

The information processing apparatus has a condition for shifting from the deep sleep state to a normal state (standby state). If the information processing apparatus satisfies the condition, it starts supply of electric power to the areas to which the supply of electric power has been stopped, and returns to a state (standby state) that renders the main functions of the information processing apparatus to be usable.

Generally, the return condition includes two cases: (1) a button in the operation unit of the information processing apparatus is pressed, and (2) the NIC of the information processing apparatus receives a particular network packet that meets the return condition. Thus, even when the information processing apparatus is in the deep sleep state, electric power is supplied to the operation unit and the NIC, and a sensor monitors whether the button is pressed and whether the network packet is received.

A particular network packet that meets the return condition described above includes generally 1) a packet forwarded to the information processing apparatus itself (a packet of which destination Media Access Control (MAC) address is the information processing apparatus itself), 2) a sleep return packet, and 3) a broadcast packet of particular protocol. The sleep return packet 2) refers to a packet having a particular packet pattern for causing the information processing apparatus to return from the deep sleep state. The broadcast packet of particular protocol 3), or a multicast packet, refers to a packet for another node on the network to search for an information processing apparatus on the network. The information processing apparatus is configured such that, if a packet received by the NIC is any one of these packets, the information processing apparatus returns from the deep sleep state to the standby state.

Further, some information processing apparatuses in recent years have a function called a proxy response that enables them to respond to a given network packet even when they are in the deep sleep state. As described above, since the CPU of the information processing apparatus is also stopped in the deep sleep state, normally the information processing apparatus cannot respond to a packet that it has received. Therefore, when the information processing apparatus receives a packet that a node on the LAN has forwarded to the information processing apparatus, the above-described return condition is satisfied, so that the information processing apparatus may return without exception from the deep sleep state. Accordingly, in an environment where there are such nodes that perform frequently communication to the information processing apparatus, or in such an environment as where many nodes exist, even though frequency of the communication is less, the information processing apparatus may frequently return from the deep sleep. Consequently, the deep sleep state cannot continue for long durations, and as a result, it is difficult to reduce power consumption to a lower level.

A technology to solve such an issue is a proxy response. The proxy response is to provide the NIC with a function of responding to a particular packet. With this technology, it becomes possible for the information processing apparatus to respond to a packet (reply to a packet) having a particular data pattern, out of network packets that the information processing apparatus has received from the LAN, without returning from the deep sleep mode. Thus, it has become possible to cause the deep sleep state to continue as long as possible and to reduce power consumption of the information processing apparatus to a lower level. Regarding the proxy response technology, for example, Japanese Patent Application Laid-Open No. 2006-259906 discusses an image processing apparatus provided with a CPU 1 that performs normal processing and a CPU 2 that operates in the power-saving state. Then a technology in which the CPU 2 responds to a received packet in the power-saving state is discussed therein. In the conventional proxy response technology, the NIC can only perform response processing to the received network packet. That is, the NIC only performs passive processing for responding to the received packet.

Nowadays, however, various network environments are built, and thus the information processing apparatus used in these network environments can perform processing for adapting to each of the network environments. There is a case where, even if the information processing apparatus is in the deep sleep state, it may be needed sometimes to actively transmit a network packet from the information processing apparatus.

For example, in a LAN environment in which computers equipped with Microsoft's Windows (registered trademark) operating systems are introduced, a name management server called a master browse server (hereinafter, called an MBS) exists. The MBS is not explicitly set up by administrators or users of the LAN but is determined by nodes on the LAN performing negotiations with one another. Therefore, an information processing apparatus participating in the network environment searches for the MBS at a given interval and then performs processing of registering the computer name (Network Basic Input Output System (NetBIOS) name) of the information processing apparatus itself on the found MBS at a given interval. This is because information saved in the MBS will be deleted at a given elapse of time, so that each node on the LAN including the information processing apparatus is to perform re-registration before information of the information processing apparatus itself is deleted. The NetBIOS name is information used during transmission and reception of files among the network nodes using a Server Message Block (SMB).

In this process, update time information such as time or interval when or at which the MBS deletes information varies according to types of network environments or operating systems. Then, a time interval is set for the information processing apparatus at which information of the information processing apparatus itself is registered on the MBS. Registration processing on the MBS in accordance with the setting is processed by the main CPU of the information processing apparatus. However, if the information processing apparatus is put into the above-described deep sleep state, the main CPU will be eventually stopped as described above. Consequently, there may be an issue that the information processing apparatus cannot know the time interval at which to register its own information on the MBS, thus becoming unable to execute any registration processing.

As another example, a device that supports NetBIOS and Transmission Control Protocol/Internet Protocol (TCP/IP), if a WINS server exists on the LAN, performs processing of registering a NetBIOS name and an Internet Protocol (IP) address of the information processing apparatus itself on the WINS server at a given interval. The WINS server (Windows (registered trademark) Internet Name Service server) is a server for managing the NetBIOS name and the IP address in a pair of each node on the network. The WINS server is installed by users such as administrators in the LAN environment. Hence, the information processing apparatus is provided with a registration unit for designating the WINS server. More specifically, the information processing apparatus includes the registration unit for registering the IP address of the WINS server. The information processing apparatus performs processing of registering a pair of the NetBIOS name and the IP address of the information processing apparatus itself in the registered address. When the registration is performed, the next registration time is designated from the WINS server to the information processing apparatus. When the designated registration time has been reached, the information processing apparatus performs again processing of registering a pair of the NetBIOS name and the IP address of the information processing apparatus itself on the WINS server. The series of registration processing is processed by the main CPU of the information processing apparatus. However, when the information processing apparatus enters into the above-described deep sleep state, the main CPU will be eventually stopped as described above. Consequently, the information processing apparatus cannot know address information and the like of the WINS server, and thus becomes unable to execute any registration processing.

SUMMARY OF THE INVENTION

According to an aspect of the present invention, an apparatus includes a storage unit configured to store address information of a server, a transmission unit configured to transmit information of the apparatus at a regular interval to the server via a network interface device according to the stored address information, a detection unit configured to detect that the apparatus has satisfied a condition for shifting to a power-saving state, and a notification unit configured to, if the condition has been satisfied, notify the network interface device of the stored address information and the information of the apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
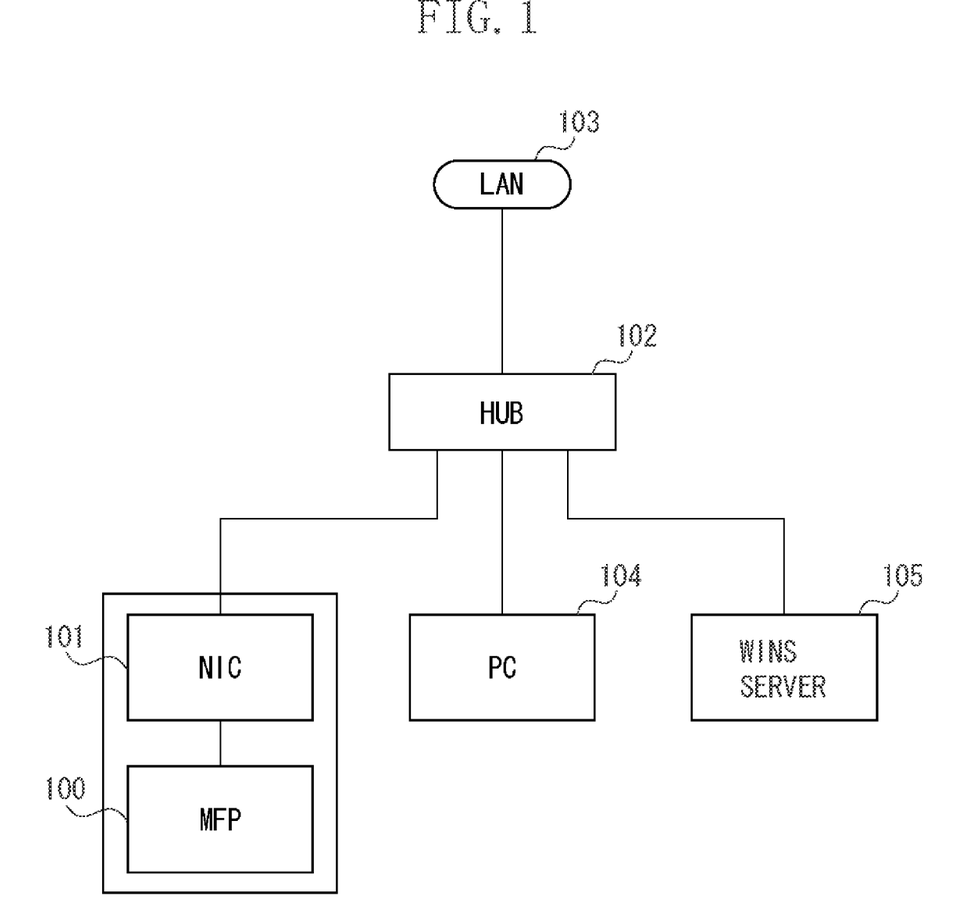
FIG. 1 illustrates a configuration of a communication system according to an exemplary embodiment of the present invention.

FIG. 1 illustrates a configuration of a communication system according to an exemplary embodiment of the present invention. In the communication system illustrated in FIG. 1, an information processing apparatus 100 (hereinafter, referred to as an MFP) is connected to a hub 102 via a network interface device 101 (hereinafter, referred to as an NIC). In other words, an information processing system is constituted of the MFP 100 and the NIC 101. The hub 102 is further connected to a LAN 103, and the information processing apparatus 100 is able to communicate with each device on the network via the network interface device 101. A PC 104 and a WINS server 105 in addition to the NIC 101 are connected to the hub 102. The PC 104 is a personal computer operable as a master browse server (hereinafter, referred to as an MBS). The WINS server 105 is a personal computer provided with functions of the WINS server. Generally, in the LAN environment where the WINS server exists, the MBS does not exist or the WINS server does not operate as the MBS. This is because the WINS server can provide functions that the MBS can provide in place of the MBS. In the present exemplary embodiment, descriptions will be given taking the case where the WINS server and the MBS exclusively exist as an example. That is, in the communication system in FIG. 1, in the case where the WINS server 105 exists, the PC 104 is assumed to operate as a normal PC without operating as the MBS. Conversely, in the case that the WINS server 105 does not exist, the PC 104 is assumed to operate as the MBS. In the present exemplary embodiment, descriptions will be given taking the case where the WINS server and the MBS exclusively exist as an example, but it is also possible that the both exist.

Figure 2:
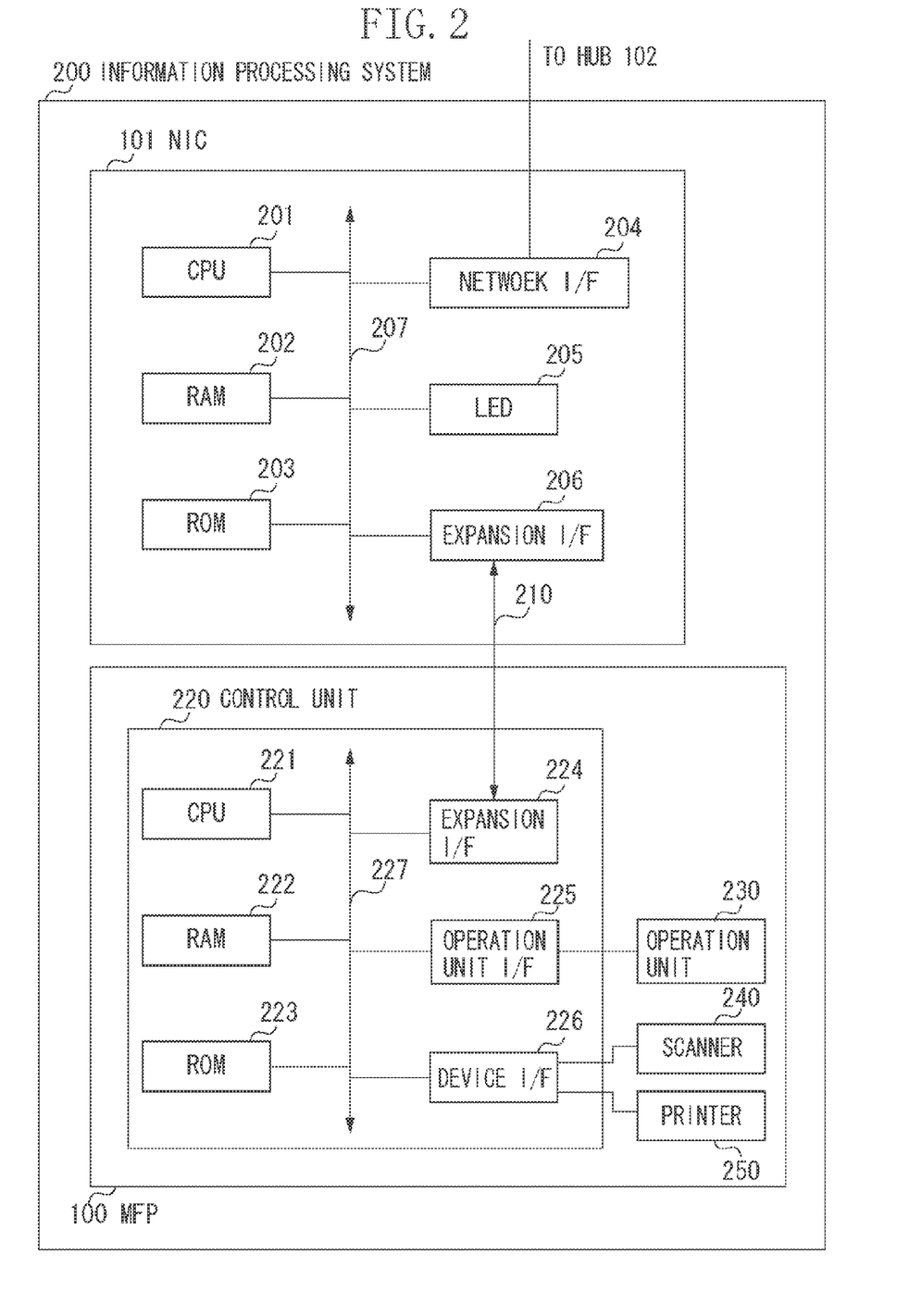
FIG. 2 illustrates a configuration of hardware of an information processing system.

FIG. 2 is a block diagram illustrating a configuration of an information processing system 200 including the MFP 100 and the NIC 101. The NIC 101 is a network interface device attachable and detachable to and from the MFP 100, implemented by an intelligent type network card module. Then, the NIC 101 includes a CPU 201 for the NIC 101, a RAM 202, a read-only memory (ROM) 203, a network I/F 204, a light-emitting diode (LED) 205, an expansion interface (I/F) 206, and a system bus 207 that interconnects these components.

The CPU 201 reads out a control program stored in the ROM 203 and executes various types of control processing. For example, the CPU 201 is connected to the hub 102 via the network I/F 204 connected to the system bus 207, and further executes processing of communicating in accordance with a predetermined communication protocol with terminals on the LAN 103 via the hub 102. Accordingly, for example, the CPU 201 receives various types of data (network packets) such as print data and printer control commands transmitted from a print data generation device on the LAN 103, and transfers them to the MFP 100 via the expansion I/F 206. As a result, print processing can be performed by the MFP 100. The RAM 202 is used as a temporary storage area such as a main memory, a work area for the CPU 201. The LED 205 is used as a display unit for indicating operation states of the NIC 101. The LED 205 can indicate, for example, an electrical connection state between the network I/F 204 and the hub 102 and various operation states such as communication modes in color and flashing patterns of the LED. The expansion I/F 206 is an I/F for connecting the NIC 101 and the MFP 100, and is connected to the expansion I/F 224 at the MFP 100 side via a local cable 210. The expansion I/F 206 is configured to include a connector not shown. The NIC 101 is attachable and detachable to and from the MFP 100 by the connector, and it is also possible to attach the NIC 101 to another MFP having the same configuration.

On the other hand, the MFP 100 includes a control unit 220, an operation unit 230, a scanner 240, and a printer 250. The control unit 220 includes a CPU 221 for the MFP 100, a RAM 222, a ROM 223, an expansion I/F 224, an operation unit I/F 225, a device I/F 226, and a system bus 227 for interconnecting these components. The CPU 221 reads out a control program stored in the ROM 223 and executes various types of control processing. For example, the CPU 221 generates output image data based on print data transferred from the NIC 101 via the expansion I/F 224, and outputs them via the device I/F 226 to the printer 250. The RAM 222 works as a main memory, work area, and the like for the CPU 221. Further, the RAM 222 is configured to enable expanding a memory capacity by an optional RAM connected to an extension port not shown. In the operation unit 230, there are disposed buttons for performing settings of operation modes or the like of the MFP 100 and operations such as cancellation of print data, and a display unit such as a liquid crystal panel or LED or the like for indicating operation states of the MFP 100. Further, the settings of communication modes as described below can be also performed via the operation unit 230. The printer 250 is a printer utilizing publicly known printing technology, and executes printing of image data using, for example, an electrophotographic scheme (laser beam scheme) or an inkjet scheme, or a sublimation (thermal transfer) scheme. Further, the scanner 240 reads out images on a document to generate image data, and inputs them into the MFP 100. The MFP 100 is provided with a deep sleep (power-saving) mode that consumes less power than a standby state. Using the deep sleep state (power-saving state), power consumption can be reduced by stopping supplying power to respective units except for particular units (the operation unit 230 and the expansion I/F 224, etc.).

Figure 3:
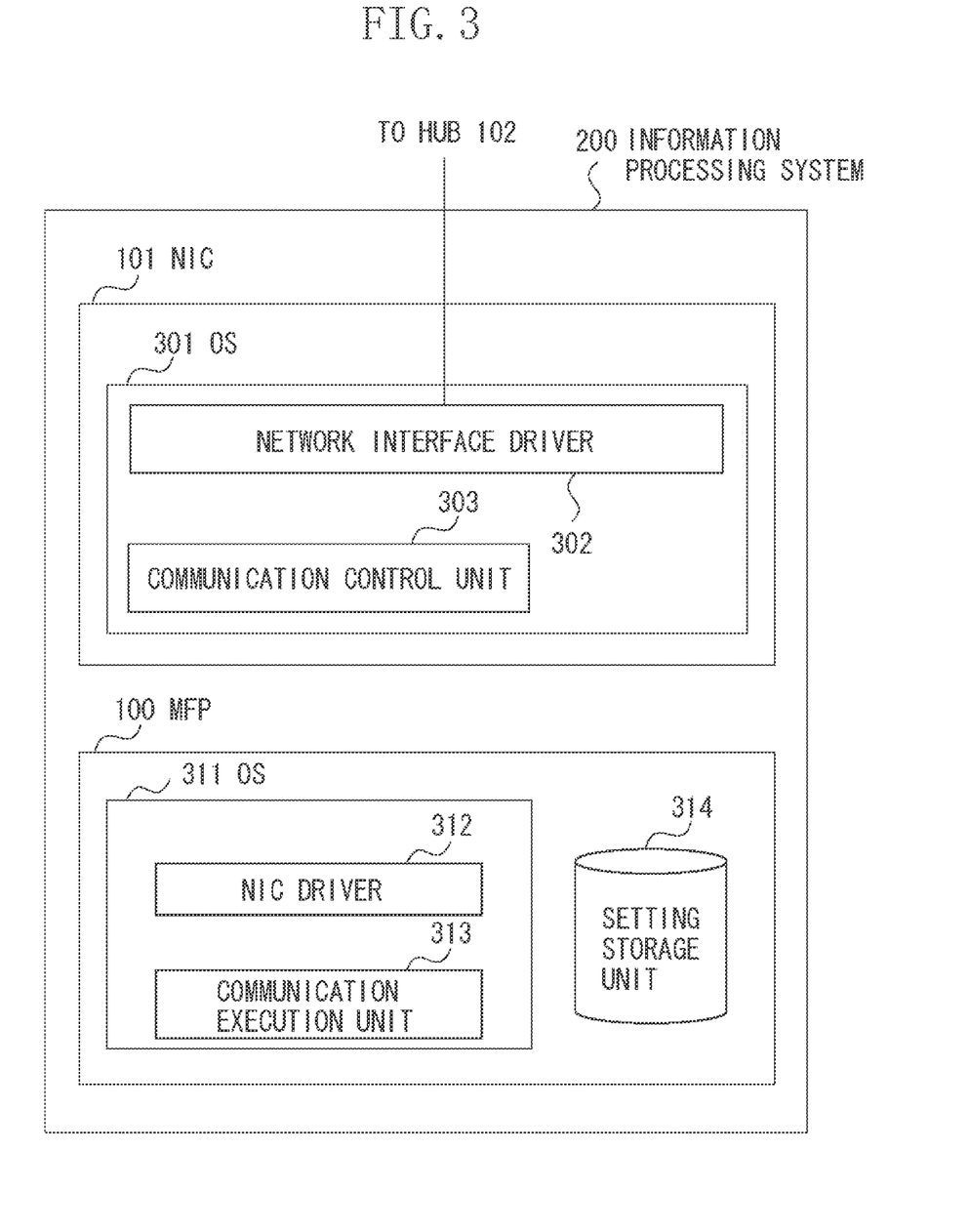
FIG. 3 illustrates a configuration of software of the information processing system.

FIG. 3 illustrates a configuration of software of the NIC 101 and the MFP 100. Only software relating to the settings of the communication modes in the NIC 101 will be herein described, but various types of software other than software described below are also provided in the NIC 101 and the MFP 100. Each type of software illustrated in FIG. 3 is stored in a memory of the NIC 101 or the MFP 100. In response to that the NIC 101 or the MFP 100 has been activated, each type of software is read out in the RAM and executed by each CPU.

An operating system (OS) 301 at the NIC 101 includes a network I/F driver 302 and a communication control unit 303. The network I/F driver 302 controls execution of the communication processing by the network I/F 204. The communication control unit 303 performs communication with the network nodes connected to the hub 102, in accordance with contents instructed from the MFP 100 side, using a method as described below.

On the other hand, an operating system (OS) 311 at the MFP 100 side includes an NIC driver 312 and a communication execution unit 313. The NIC driver 312 transmits various instructions to the NIC 101, and causes the NIC 101 to execute various operations. The communication execution unit 313 causes the NIC 101 to control communications with the network nodes connected to the hub 102, using a method as described below, and to perform various setting instructions to the communication control unit 303 via the NIC driver 312. The NIC driver 312 operates in a kernel space of the OS 311, out of respective types of software operating on the operating system 311 of the MFP 100, whereas the communication execution unit 313 is assumed to operate in a user space of the OS 311. Further, the communication execution unit 313 causes the NIC 101 to perform settings of various types of information by utilizing Application Program Interface (API) of the NIC driver 312. Various types of information refer to, for example, whether registration on the MBS is executed, a time interval at which to register on the MBS, whether registration on the WINS server is executed, an IP address as an address information of the WINS server, and a computer name (hereinafter, NetBIOS name) of the MFP 100. Further, the communication execution unit 313, if the MFP 100 is in the standby state, executes registration processing on the MBS, or executes registration processing on the WINS server. In a setting storage unit 314, if the MFP 100 is in the standby state, or in the deep sleep state, various types of information about communications when the NIC 101 communicates with the hub 102 are stored. For example, the various types of information include whether registration on the MBS is executed, a time interval at which to register on the MBS, whether registration on the WINS server is executed, an IP address of the WINS server, and a NetBIOS name of the MFP 100, as described above. Further, address information for the MFP 100 to perform network communication with external nodes, such as the IP address and the subnet mask of the MFP 100, are also stored. The CPU 221 of the MFP 100 stores information determined by the communication execution unit 313 in the setting storage unit 314, and transmits instructions to the NIC 101 according to information stored in the setting storage unit 314.

Next, processing executed by the information processing system 200 will be described with reference to a flowchart illustrated in FIG. 4. Of the flowchart illustrated in FIG. 4, each step in the left side from a short dashed line is executed by the CPU 221 of the MFP 100. Further, each step in the right side from the short dashed line is executed by the CPU 201 of the NIC 101.

First, in step S401, the MFP 100 performs activation of the information processing system 200. Activation of the system means that power of the MFP 100 has been turned on, various programs has been started up, and the MFP 100 has completed startup of all functions as the MFP. Next in step S402, the MFP 100 performs processing for defined processing "A". The defined processing "A" will be specifically described with reference to a flowchart illustrated in FIG. 5. Each step of the flowchart in FIG. 5 is executed by the CPU 221 of the MFP 100.

In step S501, the MFP 100 checks whether registration processing on the WINS server is to be performed. In this process, if a setting value indicating the setting of the registration processing on the WINS server recorded in the setting storage unit 314 is a value indicating that the setting to the WINS server is to be performed (YES in step S501), then the processing proceeds to step S502. On the other hand, if a setting value indicating the setting of the registration processing on the WINS server recorded in the setting storage unit 314 is a value indicating that the registration processing on the WINS server is not to be performed (NO in step S501), then the processing proceeds to step S504.

In step S502, the MFP 100 transmits, to an IP address of the WINS server saved in the setting storage unit 314, the NetBIOS name and the IP address of the MFP 100 saved in the same setting storage unit 314. Accordingly, the MFP 100 registers the NetBIOS name and the IP address of the MFP 100 on the WINS server. After that, in step S503, the MFP 100 determines whether registration in the WINS server in step S502 is successful. Specifically, the MFP 100 determines whether the MFP 100 has received a response that registration is successful from the WINS server, with respect to a registration request transmitted in step S502. When the MFP 100 receives the response that the registration is successful, the MFP 100 receives information indicating a next registration time to the WINS server in addition. Then, the MFP 100 keeps the information indicating the next registration time to the WINS server to be stored. If the MFP 100 cannot receive the response, as having failed in the registration processing (NO in step S503), then the processing proceeds to step S508.

In step S508, the communication execution unit 313 displays a message for notifying the user of having failed in the registration on the WINS server on the display unit, which is a part of the operation unit 230 of the MFP 100. For example, a message like "You have failed in registration on WINS server. Please confirm setting" will be displayed on the display unit.

Figure 4:
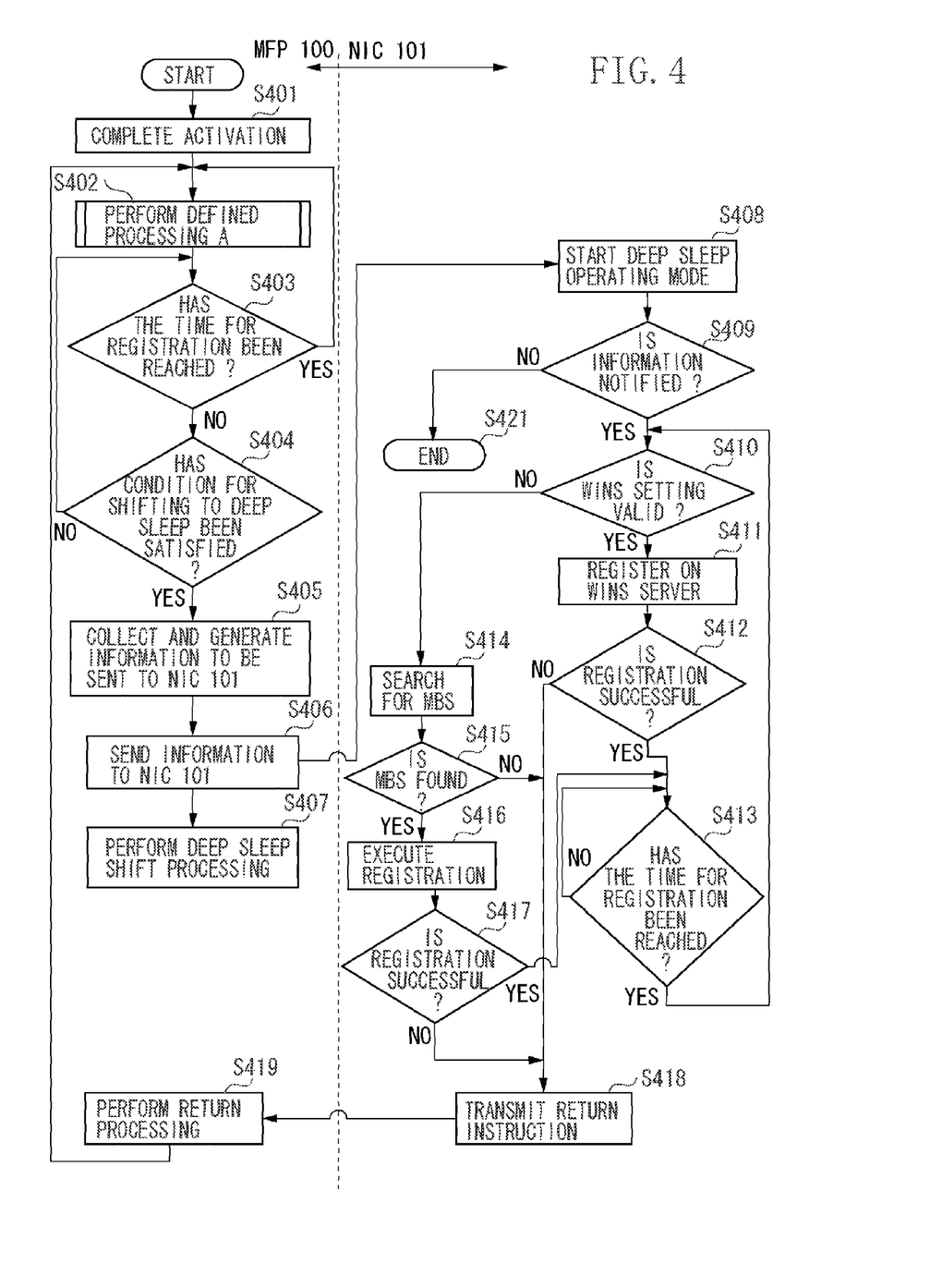
FIG. 4 is a flowchart illustrating a flow of processing executed by the information processing system.
Figure 5:
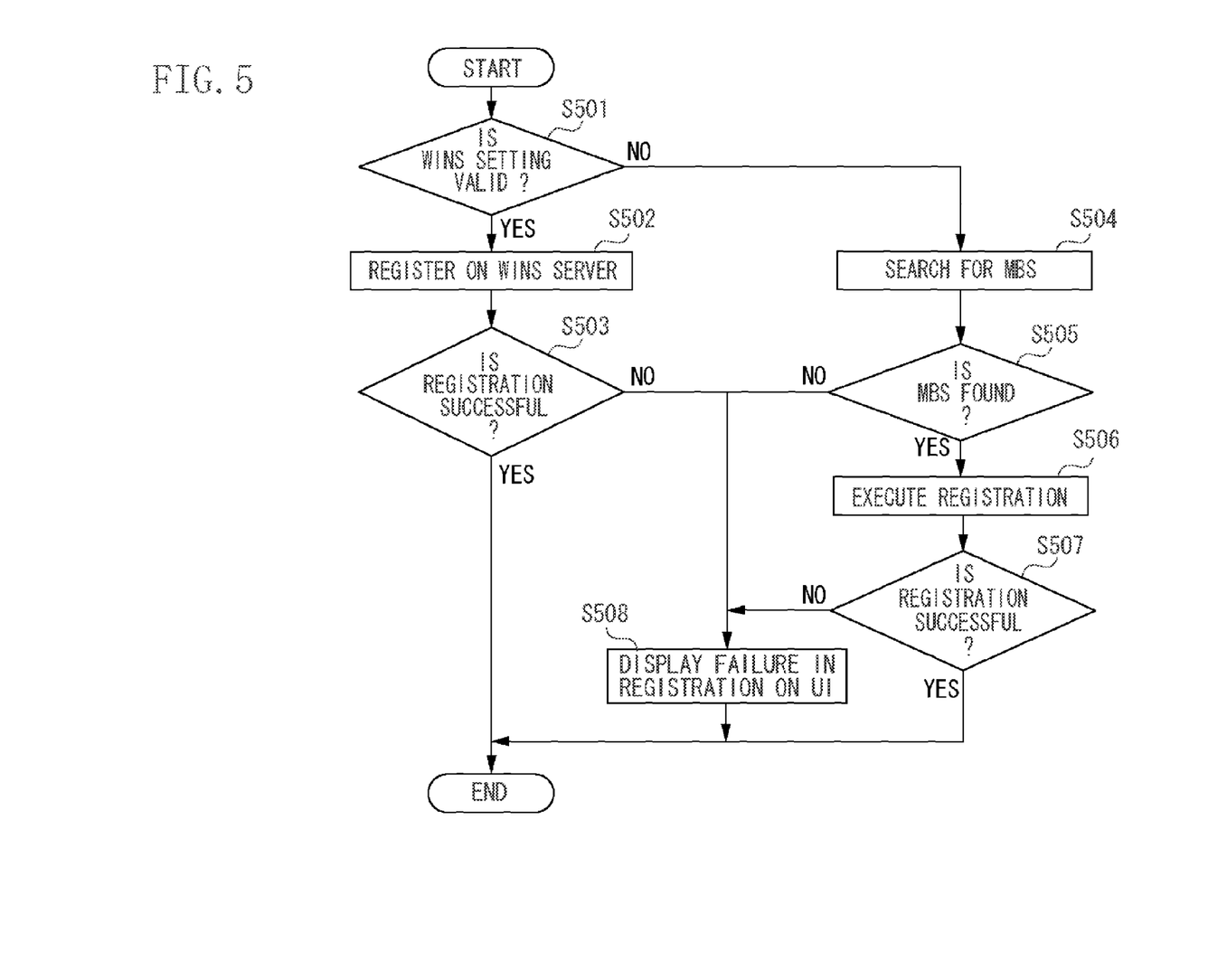
FIG. 5 is a flowchart illustrating defined processing "A" executed in a multifunction peripheral (MFP).

In step S503, if it is determined that the registration on the WINS server is successful (YES in step S503), the MFP 100 terminates the defined processing "A", and then the processing proceeds to step S403 in FIG. 4.

Processing in the case where it is determined that the registration processing on the WINS server is not needed in step S501 will be described. If a setting value indicating the setting of the registration processing on the WINS server recorded in the setting storage unit 314 is a value indicating that the registration processing on the WINS server is not to be performed (NO in step S501), the processing proceeds to step S504. In step S504, the MFP 100 searches for an MBS. Specifically, the MFP 100 transmits a search request packet for searching for the MBS into the same IP subnet as the MFP 100. Then if the MBS exists within the same IP subnet as the MFP 100, the MBS responds to the search request packet that the MFP 100 has forwarded. The MFP 100, after having transmitted the search request packet in step S504, waits for a response from the MBS for a given length of time. In step S505, the MFP 100 determines whether the MBS is found. That is, if there is a response from the MBS to the transmitted search request packet within the given length of time, it is determined that the MBS is found (YES in step S505), and then the processing proceeds to step S506. On the other hand, if there is no response even after the given length of time has elapsed, it is determined that the MBS is not found (NO in step S505), and then the processing proceeds to step S508.

In step S506, the MFP 100 transmits the NetBIOS name of the MFP 100 saved in the setting storage unit 314 to the IP address of the MBS that has transmitted the response. Accordingly, the MFP 100 registers the NetBIOS name of the MFP 100 on the MBS. After that, in step S507, the MFP 100 determines whether the registration on the MBS in step S506 is successful. Specifically, the MFP 100 determines whether the MFP 100 has received the response that registration is successful from the MBS to the registration request transmitted in step S506. If it is determined that the MFP 100 has not been able to receive the response, and has failed in the registration processing (NO in step S507), the processing proceeds to step S508.

In step S508, the communication execution unit 313 displays a message for notifying a user of having failed in registration on the MBS on the display unit, which is a part of the operation unit 230 of the MFP 100. For example, a message like "You have failed in the registration on the MBS". Please confirm the setting" is displayed on the display unit.

In step S507, if it is determined that the registration on the MBS is successful (YES in step S507), the MFP 100 terminates the defined processing "A", and then the processing proceeds to step S403 in FIG. 4.

In step S403 in FIG. 4, the MFP 100 determines whether the time for registration of information on the WINS server or the MBS has been reached. In this process, information of the time to be referred to varies between the case where the registration processing on the WINS server is set in the MFP 100 and the case where the registration processing on the MBS is set. In the case where the registration processing on the WINS server is set, the MFP 100 determines whether the time notified from the WINS server when the registration processing on the WINS server was performed in the previous time has been reached. The time information is received from the WINS server, and is stored in the MFP 100. On the other hand, in the case where the registration processing on the MBS is set, the MFP 100 refers to the information indicating a time interval at which to register on the MBS stored in the setting storage unit 314, and determines whether the time interval has elapsed since the registration on the MBS was performed in the previous time. In step S403, if it is determined that the time for registration has been reached (YES in step S403), the processing returns to step S402, in which the defined processing "A" (see the flowchart in FIG. 5) as described above is executed. If the time for registration has not been reached (NO in step S403), the processing proceeds to step S404.

In step S404, the MFP 100 detects whether the information processing apparatus itself satisfies the condition for shifting to the deep sleep state. The condition is to be set by the user in advance, and in this process, if any operation has not been performed by the user for a given length of time or a given length of time has elapsed since a printing operation was completed, it is assumed to be set such that the MFP 100 shifts to the deep sleep state. If it is detected that the MFP 100 satisfies the condition for shifting to the deep sleep state (YES in step S404) as a result of determination in step S404, then the processing proceeds to step S405, in which the MFP 100 performs a series of processing for shifting to the deep sleep state.

In step S405, the communication execution unit 313 performs processing of collecting information to be sent to the NIC 101. The communication execution unit 313 acquires the following information from the setting storage unit 314. (1) whether the registration on the MBS is to be executed, (2) a registration time interval on the MBS, (3) whether the registration on the WINS server is to be executed, (4) an IP address of the WINS server, and (5) a NetBIOS name of the MFP 100. Further, the communication execution unit 313 acquires an IP address of the MFP 100 itself from the OS 311. As described above, in the present exemplary embodiment, the registration processing on the WINS server and the registration processing on the MBS will not be performed at the same time. Therefore, setting values of (1) and (3) are in an exclusive relationship. That is, only one of (1) and (3) will become YES. The communication execution unit 313, when acquiring information from the setting storage unit 314, uses a dedicated API, and when acquiring information from the OS 311, uses an ioctl (input/output control) command.

Next in step S406, the communication execution unit 313 performs processing of notifying the communication control unit 303 within the NIC 101 of the information acquired in step S405. The communication execution unit 313 notifies the communication control unit 303 of the information acquired in step S405 using the ioctl command prepared in advance by the NIC driver 312. Next, the processing in step S407 is performed as the processing in the MFP 100 side, and at the same time the processing in step S408 is performed as the processing in the NIC 101. In step S407, the CPU 221 performs processing for causing the MFP 100 to shift to the deep sleep state, and the CPU 221 stops its operation. That is, the CPU 221 stops supplying electric power to each unit except for particular units such as the operation unit 230 and the expansion I/F 224.

In step S408, the communication control unit 303 of the NIC 101 shifts to a deep sleep operating mode. The deep sleep operating mode herein used refers to an operating mode to perform a series of processing from step S409 to step S418 as described below when the MFP 100 is in the deep sleep state. The deep sleep operating mode continues while the MFP 100 is in the deep sleep state. The case where the MFP 100 returns from the deep sleep state to the standby state refers to the case where a particular button of the operation unit 230 is pressed by a user, the case where the MFP 100 has received a particular network packet, or the case where the processing in step S418 as described below is performed. In the case where the particular button of the operation unit 230 is pressed by the user or the case where the MFP 100 has received the particular network packet, even if a step that the NIC 101 is processing is any step of steps S409 to S417, the CPU 201 interrupts the processing. Then, the NIC 101 transmits a signal (return instruction) that urges the MFP 100 to return from the deep sleep state to the standby state. If the MFP 100 has received the signal, then in step S419, the MFP 100 causes respective portions that have been stopped in step S407 to return to the standby state, and the MFP 100 shifts again to the standby state. After that, the MFP 100 returns to step S402 and executes again the defined processing "A" as described above. That is, the MFP 100 resumes transmitting regular information as the need arises. If the MFP 100 returns from the deep sleep state to the standby state by the factors that the particular button of the operation unit 230 is pressed by the user or the particular network packet is received, then the MFP 100 executes the processing in step S402. However, if the MFP 100 returns from the deep sleep state according to the return instruction notified from the NIC 101 by the processing in step S418 described below, the MFP 100, before performing processing in step S402, displays a message indicating that the MFP 100 has failed in the registration on the WINS server or on the MBS on the display unit. As described below, in this case, this is because, since the return instruction that the MFP 100 receives from the NIC 101 contains information indicating that the MFP 100 has failed in the registration on the WINS server or on the MBS, the user is to be notified of this fact.

In the information processing system 200, processing in steps from S402 to S419 is executed in loop during the time until power of the information processing system 200 is turned off.

Returning to description in step S409, the deep sleep operating mode executed in the NIC 101 will be described. In step S409, the communication control unit 303 determines whether information is notified from the MFP 100. This processing is to check whether information required when performing the registration processing (deep sleep operating mode) on the WINS server or on the MBS described below is all notified, which corresponds to determining whether the deep sleep operating mode is executable.

If it is determined that information is not notified from the MFP 100 (NO in step S409), that is, if information notified by the communication execution unit 313 in step S406 is insufficient, then the processing proceeds to step S421. Information being insufficient refers to, out of information of (1) to (5) notified from the communication execution unit 313 described above, the case where there is no information of (2) even though (1) is YES, the case where there is no information of (4) even though (3) is YES, and also, the case where there is no information of (5). In such a case, since the NIC 101 cannot execute the registration processing on the WINS server or on the MBS, the NIC 101 becomes unable to execute the deep sleep operating mode in steps S410 or later. Therefore, the processing proceeds to step S421, and the NIC 101 does not execute the deep sleep operating mode. However, even in this case, since the NIC 101 itself is operating, it is a matter of course that reception of normal network packet and processing of a predetermined proxy response can be continuously executed.

In step S409, if it is determined that all information for the NIC 101 to operate as the deep sleep operating mode is notified (YES in step S409), the processing proceeds to step S410. In step S410, it is checked whether the registration processing on the WINS server is to be used. In this process, if a setting value (setting value of the above-described (3)) indicating the setting of the registration processing on the WINS server contained in the information notified from the MFP 100 is a value (YES) indicating that the setting to the WINS server has been performed (YES in step S410), the processing proceeds to step S411. On the other hand, if a setting value indicating the setting of the registration processing on the WINS server contained in information notified from the MFP 100 is a value (NO) indicating that the registration processing on the WINS server has not been performed (NO in step S410), the processing proceeds to step S414.

In step S411, the MFP 100 transmits, to an IP address of the WINS server notified from the MFP 100, the NetBIOS name and the IP address of the MFP 100 notified in the same way. Accordingly, the MFP 100 registers the NetBIOS name and the IP address of the MFP 100 on the WINS server. After that, in step S412, the MFP 100 determines whether the registration on the WINS server in step S411 is successful. Specifically, the MFP 100 determines whether the NIC 101 has received a response indicting that the registration is successful from the WINS server in response to a registration request transmitted in step S411. When receiving the response indicating that the registration is successful, the NIC 101 receives the information indicating the next registration time to the WINS server in addition. Then the NIC 101 retains the information indicating the next registration time on the WINS server. If it is determined that the NIC 101 cannot receive the response, and has failed in the registration processing (NO in step S412), then the processing proceeds to step S418. If it is determined that the registration is successful (YES in step S412), then the processing proceeds to step S413.

As described above, a registration interval on the WINS server is to be determined by the WINS server, but in step S411, the registration processing is performed irrespective of an elapsed time from the registration processing that the MFP 100 has hitherto performed. The reason is that, the communication control unit 303 of the NIC 101 cannot know an elapsed time from the registration processing on the WINS server that was performed for the last time in the MFP 100. Therefore, when shifting to the deep sleep operating mode, the NIC 101 firstly performs the registration processing on the WINS server irrespective of the elapsed time from the last registration processing that the MFP 100 performed. This prevents the NetBIOS name and the IP address of the MFP 100 managed within the WINS server from being deleted with an elapse of time.

In step S418, the communication control unit 303 of the NIC 101 transmits the return instruction to the standby state to the MFP 100. Further, information indicating that the registration processing on the WINS server has failed or information indicating that the registration processing on the MBS has failed is contained in the return instruction here transmitted. In step S419, the MFP 100, when receiving the return instruction, causes respective portions that have been stopped in step S407 to return, and then the MFP 100 returns again to the standby state. In this process, the MFP 100 refers to information indicating that the registration processing has failed, contained in the received return instruction, and performs display on the display unit according to the information. That is, a message like "You have failed in registration on the WINS server. Please check for the setting" or "You have failed in registration on the MBS. Please check for the setting" is displayed on the display unit of the MFP 100.

In step S412, if the registration processing on the WINS server is successful (YES in step S412), then the processing proceeds to step S413. In step S413, the NIC 101 determines whether the time for registration has been reached according to the information notified from the WINS server. If the time for registration on the WINS server has been reached (YES in step S413), the processing again shifts to step S410.

In step S410, processing performed if it is determined that the registration processing on the WINS server is not needed will be described. If a setting value indicating the setting of the registration processing on the WINS server contained in the information notified from the MFP 100 is a value indicating that the registration processing on the WINS server is not performed (NO in step S410), then the processing proceeds to step S414. In step S414, the NIC 101 searches for an MBS. Specifically, the NIC 101 transmits a search request packet for searching for an MBS into the same IP subnet as the NIC 101. Then, if an MBS exists within the same IP subnet as the NIC 101, the MBS responds to the search request packet sent from the NIC 101. The NIC 101, after having transmitted the search request packet in step S414, waits for a response from the MBS for a given length of time. In step S415, the NIC 101 determines whether the MBS is found. That is, if there is a response from the MBS to the transmitted search request packet within a given length of time, it is determined that the MBS is found (YES in step S415), then the processing proceeds to step S416. On the other hand, if there is no response after the given length of time has elapsed, it is determined that the MBS is not found (NO in step S415), then the processing proceeds to step S418. In step S418, the NIC 101 performs the above-described processing.

In step S416, the NIC 101 transmits the NetBIOS name of the MFP 100 contained in the information notified from the MFP 100 to an IP address of the MBS that has transmitted the response. Accordingly, the NetBIOS name of the NIC 101 is registered on the MBS. After that, in step S417, the NIC 101 determines whether the registration on the MBS in step S416 is successful. Specifically, the NIC 101 determines whether it has received from the MBS a response indicating that the registration is successful to the transmitted registration request in step S416. If it is determined that the NIC 101 cannot receive the response and has failed in the registration processing (NO in step S417), then the processing proceeds to step S418. In step S418, the NIC 101 performs the above-described processing. In step S417, if it is determined that the registration on the MBS is successful (YES in step S417), then the processing proceeds to step S413. Then, the NIC 101 determines whether the time for registration has been reached, based on the registration time interval on the MBS contained in the information notified from the MFP 100. If the time for registration has been reached (YES in step S413), the processing proceeds to step S410.

In this way, in the deep sleep operating mode of the NIC 101, processing in steps S410 to S417 is executed at a regular interval in loop. Therefore, if the MFP 100 enters into the deep sleep state, it is possible to cause the NIC 101 to perform regular processing executed inherently in the MFP 100, as a proxy processing. As a result, even though the MFP 100 is in the deep sleep state, processing is continued for adapting to a network environment in which the information processing system 200 participates. As a result, the need for the MFP 100 to return from the deep sleep state is eliminated. Further, if the NIC 101 has failed in the registration on the WINS server or on the MBS, the MFP 100 is caused to quickly return from the deep sleep state and the event is displayed on the display unit of the MFP 100. Therefore, the user can recognize the situation and take appropriate actions as soon as possible. In the above-described flowchart in FIG. 4, after having satisfied a shift condition to the deep sleep state (YES in step S404), then in step S405, the MFP 100 collects information to be sent to the NIC 101. However, collection of information to be sent to the NIC 101 may not be performed at this timing, but may be performed, for example, immediately after the MFP 100 is activated. Further, in the foregoing exemplary embodiment, the MFP has been described as an example of the information processing apparatus, although not only the MFP, but also devices such as a printer, a scanner, a facsimile apparatus, and a PC may be used.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-094996 filed Apr. 9, 2009, which is hereby incorporated by reference herein in its entirety.

What is claimed is:

1. An information processing system being capable of communicating with a server configured to manage a node on a network, comprises:
   an information processing apparatus to transmit, in order to register address information of the information processing apparatus in the server, the address information to the server at a predetermined time interval, in a case where the information processing apparatus operates in a first power mode; and
   a network interface device is configured to perform operations comprising:
   transmitting, in order to register the address information in the server on behalf of the information processing apparatus, the address information to the server at the predetermined time interval, in a case where the information processing apparatus operates in a second power mode in which power consumption is lower than the power consumption in the first power mode;
   determining whether the network interface device receives from the server a response indicating that a registration of the address information in the server is successful; and
   transmitting, in a case where the determining determines that the network interface device does not receive the response, a return instruction to the information processing apparatus in order to cause the information processing apparatus to return from the second power mode to the first power mode,
   wherein the information processing apparatus, in a case where the information processing apparatus receives the return instruction, returns from the second power mode to the first power mode, and
   wherein the information processing apparatus comprises a display unit to display a screen,
   wherein in a case where the information processing apparatus returns from the second power mode to the first power mode by the return instruction, the display unit displays a message indicating that the registration of the address information in the server is failed.

2. The information processing system according to claim 1, wherein the address information is an IP address of the information processing apparatus.

3. The information processing system according to claim 1, wherein the information processing apparatus transmits the address information to the server via the network interface device.

4. The information processing system according to claim 1, wherein the information processing apparatus is a printing apparatus.

5. A method for processing an information processing system including an information processing apparatus and a network interface device, the information processing system being capable of communicating with a server configured to manage a node on the network, the method comprising:
   displaying a screen; and
   transmitting, in order to register address information of the information processing apparatus in the server, the address information to the server at a predetermined time interval, in a case where the information processing apparatus operates in a first power mode;
   transmitting, in order to register the address information in the server on behalf of the information processing apparatus, the address information to the server at the predetermined time interval, in a case where the information processing apparatus operates in a second power mode in which power consumption is lower than the power consumption in the first power mode;
   determining whether the network interface device receives from the server a response indicating that a registration of the address information in the server is successful;
   transmitting, in a case where the determining determines that the network interface device does not receive the response, a return instruction to the information processing apparatus in order to cause the information processing apparatus to return from the second power mode to the first power mode;
   returning from the second power mode to the first power mode in a case where the information processing apparatus receives the return instruction; and
   displaying a message indicating that the registration of the address information in the server is failed wherein the display unit in a case where the information processing apparatus returns from the second power mode to the first power mode by the return instruction.

6. A non-transitory computer readable storage medium storing a computer-executable program of instructions for causing a computer to perform the method according to claim 5.

* * * * *